3,247,269
METHODS OF PRODUCING CYCLIC
POLYOLEFINS
Charles D. Storrs and Reginald F. Clark, Lake Charles, La., assignors, by mesne assignments, to Columbian Carbon Company, a corporation of Delaware
No Drawing. Filed Jan. 23, 1962, Ser. No. 168,248
12 Claims. (Cl. 260—666)

This invention relates to the production of cyclic polyolefins and in particular to the production of cyclododecatriene.

Cyclododecatriene is known in the prior art and is disclosed in the U.S. Patent 2,964,574 to Wilke, among others. The preparation of cyclododecatriene has also been described by many investigators and a variety of methods for preparing this compound have been devised. All of the prior art appears to be characterized by the fact that the processes produce the cyclododecatriene in relatively small yields such as in Example 5 of U.S. Patent 2,686,209 to Reed, wherein he obtains 17 grams of "a trimer" from a butadiene feed of 487.5 grams or about a 3.5% yield, disclosed elsewhere in the patent as being cyclododeca-1,5,9-triene.

It is therefore an object of this invention to provide a method for producing cyclododeca-1,5,9-triene in high yields.

It is also an object to provide methods for producing various cycloolefins having six or more carbon atoms in the ring structure.

It is also an object to provide methods for producing cyclic unsaturated oliogmers of acyclic conjugated diolefins.

It is a further object to provide a method for producing cyclododecatriene which also produces recoverable amounts of cyclooctadiene.

Further objects will be apparent to those skilled in the art, upon consideration of the following description.

This invention is based on the discovery that conjugated open chain diolefins may be trimerized to give high yields of cyclododecatriene by subjecting the diolefins to the influence of a catalyst of the following formula:

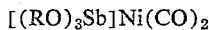

in which R is an organic radical. Such a reaction also produces dimers (such as vinylcyclohexene, and cyclooctadiene), tetramers and pentamers.

The trimerization reaction of this invention is preferably carried out in the absence of extraneous hydrocarbon activators (e.g. isobutylene). It is preferred that the bis[tri-organoantimonite] nickel dicarbonyl be the sole catalytic material in the reactions contemplated by this invention.

The catalysts within the scope of this invention are derivatives of nickel carbonyl and may be prepared generally by replacing two of the carbonyl groups of nickel tetracarbonyl with two triorganoantimonite groups.

The reaction in which the carbonyl groups are replaced by the antimonite groups must be held at low temperatures (i.e. 0 to 5° C.) during the mixing procedure in order to prevent the loss of the nickel carbonyl. The replacement reaction, which evolves carbon monoxide, takes place in two distinct stages, the termination of each stage being concurrent with a distinct reduction in the volume of carbon monoxide being evolved. During the initial carbonyl replacement, while there is still unreacted nickel tetracarbonyl in the reaction mixture, the temperature is preferably held below about 40° C., and preferably between 30° and 40° C. The first carbonyl replacement requires about 24 hours, after which the temperature may be raised. Although it is preferable that the second carbonyl replacement takes place at temperatures not exceeding 110° C., temperatures of 200° C. have been determined to be useful. The time required for the replacement reaction is a function of temperature, the replacement being somewhat faster at higher temperatures. Using temperature of 0° to 110° C., residence times of 24 hours to 130 hours will be required.

It is generally preferable to have an excess of the antimonite compound present during the replacement reaction, the range of 1 to 100% stoichiometric excess of the antimonite compound being useful. Example 1, below, illustrates the production of bis[triphenylantimonite] nickel dicarbonyl in which a 26% stoichiometric excess of the antimonite was used. The presence of the excess tends to reduce the time required for the replacement reaction and is desired for that reason. The reaction may be run in the absence of any stoichiometric excess of the antimonite, but it is preferred that at least a stoichiometric equivalent of the antimonite compound be present in order to avoid the release of any unreacted nickel tetracarbonyl in the distillation step of the catalyst purification.

The following example is illustrative of a method of preparing bis[triphenyl antimonite] nickel dicarbonyl.

*Example 1*

A solution of 55 grams of triphenylantimonite dissolved in 150 mls. of toluene was added dropwise to 8 mls. of nickel tetracarbonyl dissolved in 100 mls. of toluene. This addition was carried out at 0–5° C. During the addition of the toluene solution of triphenylantimonite, a carbon monoxide evolution was detectable indicating a reaction. A residence time, at 60–70° C., of 72 hours was required to drive the reaction to completion. The toluene was removed by vacuum distillation and the crude product, a light gray solid, was dissolved in acetone. Methyl alcohol was added to the acetone solution to precipitate the complex. Recrystallization of the crude product yielded a white solid melting from 131–3° C.

Preparation of the complex can be represented by the following equation:

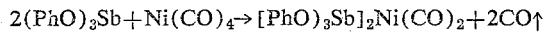

As was mentioned above, the catalyst is produced by the reaction of nickel carbonyl and a triorgano antimonite compound. The antimonite compounds within the scope of this invention are preferably trihydrocarbyl antimonite compounds, although all triorgano antimonite compounds are contemplated as being useful. Specifically, the antimonite compounds may be a trialkylaantimonite such as trimethylantimonite, triethylantimonite, trivinylantimonite, triallylantimonite, tributylantimonite, triisobutylantimonite, diethyl isobutyl antimonite, trihexyl antimonite, and tridodecyl antimonite; tricycloalkyl antimonites such as tricyclohexylantimonite, tricyclohexenylantimonite, and tricyclooctadienylantimonite; triarylantimonite such as triphenylantimonite, tri-2,5-xylylantimonite, tri-1-naphthylantimonite and tri-4-biphenylantimonite; the mixed alkyl-aryl-antimonites such as phenyldimethylantimonite, 4-tolyldimethylantimonite, phenyl diallyl antimonite, diphenylcyclohexylantimonite, and phenylcyclohexylmethyl antimonite; halogen substituted trihydrocarbylantimonite such as tris(2-chloroethyl) antimonite, tris-m-chlorophenyl antimonite, 4-chlorophenyl dimethyl antimonite, and bis(2-chloroethyl) phenyl antimonite; and oxygen substituents of trihydrocarbyl antimonites such as tris(hydroxyethyl) antimonite, tris(m-methoxyphenyl) antimonite, tri(p-phenoxyphenyl) antimonite, and ethyl phenyl 4-methoxyphenylantimonite.

The catalyst of this invention is useful in cyclization reaction when present in concentrations of from 0.05% to 10% or higher by weight based upon the weight of the principal reactant. The preferred catalyst concentration is from about 0.2 to 2.0% on the same basis. The catalyst concentrations exceeding 10% by weight, when used in batch type reactions, do not produce any increase in selectivity or conversion nor do such concentrations affect the speed of the reaction, but these higher concentrations may be useful under some conditions, such as continuous processes.

The catalyst is preferably used in the form of a solution of the catalyst in a hydrocarbon solvent such as benzene, although under some conditions solvents are not required. Basically any solvent, which dissolves the catalyst without reacting with the catalyst and which does not interfere with the distillation or separation of the products may be used. Suitable solvents include benzene, toluene, p-cymene, naphtha, tetrahydrofuran and petroleum ether. It is also contemplated that the catalyst may be introduced into the reaction vessel in the form of a solid and dissolved in the principle reactant as the feed is introduced into the reaction vessel under pressure, also in the form of a liquid.

When using catalyst solvents, such as those alluded to above, the weight ratio of solvent to catalyst may be from about 5 to 1 to about 50 to 1. Examples 2 and 3, below, show solvent to catalyst ratios of 20 to 1 and 30 to 1 respectively.

The cyclization reaction may be run at temperatures of from 90° C. to about 200° C. with the range of about 100° C. to about 130° C. being preferred. The lower portion of the wider temperature range is preferred since higher conversions are obtained at the lower temperatures. The use of the higher temperatures, of course, result in a faster reaction and the thus shortened reaction times may be desirable for some purposes.

While this invention may use any conjugated open chain diolefin as a starting material, 1,3-butadiene is particularly preferred. The 1,3-diolefins are generally preferred, including 2-methyl-1,3-butadiene (isoprene); 2-chloro-1,3-butadiene (chloroprene); 2,3-dichloro-1,3-butadiene; 1,3-pentadiene (piperylene); 2,3-dimethyl-1,3-butadiene; and phenyl diolefins. Partially substituted halogen derivatives, including mixed halogen derivatives, such as 2,3-chlorofluoro-1,3-butadiene, may be used. Other open chain conjugated diolefins such as 2,4-octadiene, 2,4-hexadiene and 3,5-octadiene are useful.

It is desirable that the feed be relatively pure prior to the cyclization reaction, although relatively impure feeds may be useful under some conditions. In order to obtain the highest possible selectivities with the catalysts of this invention, large amounts of water (e.g. over 100 parts per million) in the feed should be removed. Excessive amounts of water may be removed with conventional dehydrating agents such as calcium oxide, or calcium sulfate. Other techniques known in the art may be used to dehydrate the feed.

The feed used for Examples 2 and 3, below, was derived from ordinary "plant" butadiene having a purity of 98.5% with respect to overall hydrocarbon content. Typically isobutylene, trans-butene-2, cis-butene-2, propylene, propadiene, 1,2-butadiene, and acetylenes make up the balance of the hydrocarbon portion of the feed. Such feed also may have a carbonyl compound content of up to 100 parts per million and a water content of several hundred parts per million. Although the "plant" butadiene was dried over calcium sulfate before use, in order to reduce the water content below 100 parts per million, no other purification steps were necessary. Highly purified feed, having less than 10 parts per million of any impurities, of course, may be successfully used in the processes of this invention.

The cyclization reaction may take place at pressures of from about 100 p.s.i.g. to about 2000 p.s.i.g., the higher pressure being only limited by the strength of the reaction vessel employed.

The following examples are illustrative of the cyclization process of this invention. Although the only catalyst shown is bis(triphenylantimonite) nickel dicarbonyl, any of the catalysts described above may be employed under similar conditions.

*Example II*

A solution of 1.5 grams of bis(triphenylantimonite) nickel dicarbonyl dissolved in 30 grams of benzene was placed in a stirred autoclave. The autoclave was then charged with 79 grams of 1,3-butadiene and held at temperatures between 160° C. and 170° C. for 205 minutes. An infrared analysis of the material in the autoclave showed a yield of 21% 1,5-cyclooctadiene; 27% vinylcyclohexene; and 18% 1,5,9-cyclododecatriene. Based on the 70% conversion of the 1,3-butadiene achieved, this amounts to a selectivity of 26% for the 1,5,9-cyclododecatriene.

*Example III*

A solution of 1 gram bis(triphenylantimonite) nickel dicarbonyl dissolved in 30 grams of benzene was charged into a 300 ml. autoclave. The autoclave was evacuated to remove all the air and 73 grams of butadiene was then charged to the autoclave. The temperature was increased to 130° C. and maintained for a period of 1.25 hours. After cooling and venting the unreacted butadiene, 100 grams of crude reaction mixture was removed from the autoclave. This represented a 94% conversion of the butadiene assuming no benzene loss. Selectivities based on infrared analyses are as follows: cyclooctadiene —39%; cyclodecatriene—37%; vinylcyclohexene—14%; high boiling material—10%.

Although the two examples, above, show the use of a small autoclave as the reaction vessel, many alternatives exist. The reactions of this invention may be used in batch, semi-continuous, or continuous apparatus including stirred autoclaves, back mixing reactors as described by Levine in copending application S.N. 82,546 filed January 13, 1961, and such other apparatus as will be obvious to those skilled in the art.

It may be desirable, although not essential, to include a polymerization inhibitor in the diolefin feed in order to prevent the feed from polymerizing during storage. Although the usual inhibitors are largely removed from the feed during the drying operation, residual amounts of inhibitors in the feed appear to exert no adverse effects on the reaction. The usual inhibitors employed by the art, such as catechols, quinones or amines, may be used with processes of this invention.

As used in this invention conversion, yield and selectivity are defined as follows $$\text{conversion} = \frac{\text{weight of feed reacted} \times 100}{\text{weight of feed}}$$

$$\text{yield} = \frac{\text{weight of selected product} \times 100}{\text{weight of feed}}$$

$$\text{selectivity} = \frac{\text{weight of selected product} \times 100}{\text{weight of feed reacted}}$$

The term "hydrocarbyl," as used in the specification and claims, is intended to mean an organic radical consisting of only hydrogen and carbon atoms.

Many widely different embodiments of this invention may be made without departing from the spirit and scope of this invention and it is to be understood that this invention is not limited to the specific embodiments described herein except as defined in the appended claims.

We claim:

1. A method of preparing cyclic unsaturated oligomers, which comprises subjecting an acyclic conjugated diolefin to the influence of a catalyst of the formula:

[(RO)$_3$Sb]$_2$Ni(CO)$_2$ in which R is an organic radical, said diolefin and said catalyst being the only active materials present in the reaction mixture, at a temperature of between about 90° C. and 200° C.

2. A method as described in claim 1, wherein R is a hydrocarbyl radical.

3. A method of preparing cyclic olefins having at least six carbon atoms in the ring structure, which comprises subjecting an acyclic conjugated diolefin to the influence of a catalyst of the formula:

$$[(RO)_3Sb]_2Ni(CO)_2$$

in which R is an organic radical, said diolefin and said catalyst being the only active materials present in the reaction mixture, at a temperature of between about 90° C. and 200° C.

4. A method as described in claim 3, wherein R is a hydrocarbyl radical.

5. A method of preparing cyclic polyolefins having at least eight carbon atoms in the ring structure, which comprises subjecting an acyclic conjugated diolefin to the influence of a catalyst of the formula:

$$[(RO)_3Sb]_2Ni(CO)_2$$

in which R is an organic radical, said diolefin and said catalyst being the only active materials present in the reaction mixture, at a temperature of between about 90° C. and 200° C.

6. A method as described in claim 5 wherein R is a hydrocarbyl radical.

7. A method of preparing cyclic polyolefins having at least 12 carbon atoms in the ring structure and at least 3 carbon to carbon double bonds in said ring structure, comprising subjecting an acyclic conjugated diolefin to the influence of a catalyst of the formula:

$$[(RO)_3Sb]_2Ni(CO)_2$$

wherein R is an organic radical, said diolefin and said catalyst being the only active materials present in the reaction mixtures, at a temperature of between about 90° C. and 200° C.

8. A method as described in claim 7 wherein R is a hydrocarbyl radical.

9. A method as described in claim 7 wherein R is a hydrocarbyl radical having not more than 12 carbon atoms.

10. A method as described in claim 7, wherein R is a phenyl radical.

11. A method as described in claim 7, wherein said diolefin is 1,3-butadiene.

12. A method of preparing cyclic polyolefins having at least 12 carbon atoms in the ring structure and at least 3 carbon to carbon double bonds in said ring structure, and including a substantial proportion of 1,5,9-cyclododecatriene, comprising subjecting 1,3-butadiene to the catalytic influence of bis(triphenylantimonite) nickel dicarbonyl, said butadiene and said catalyst being the only active materials introduced into the reaction zone, conducting said method at a temperature of between about 90° C. and 130° C., and recovering a substantial proportion of 1,5,9-cyclododecatriene after completion of the reaction.

References Cited by the Examiner

UNITED STATES PATENTS

| | | | |
|---|---|---|---|
| 2,686,208 | 8/1954 | Reed | 260—666 |
| 2,686,209 | 8/1954 | Reed | 260—666 |
| 2,991,317 | 7/1961 | Sellers et al. | 260—666 |

DELBERT E. GANTZ, *Primary Examiner.*

ALPHONSO D. SULLIVAN, PAUL M. COUGHLAN, *Examiners.*

CHARLES E. SPRESSER, *Assistant Examiner.*